United States Patent
Asanuma et al.

(10) Patent No.: US 8,701,393 B2
(45) Date of Patent: Apr. 22, 2014

(54) EXHAUST PURIFICATION SYSTEM OF INTERNAL COMBUSTION ENGINE

(75) Inventors: Takamitsu Asanuma, Mishima (JP); Yoshihisa Tsukamoto, Susono (JP); Kazuhiro Umemoto, Susono (JP); Junichi Matsuo, Susono (JP); Hiromasa Nishioka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 187 days.

(21) Appl. No.: 13/383,331

(22) PCT Filed: Jul. 23, 2009

(86) PCT No.: PCT/JP2009/063536
§ 371 (c)(1),
(2), (4) Date: Jan. 10, 2012

(87) PCT Pub. No.: WO2011/010398
PCT Pub. Date: Jan. 27, 2011

(65) Prior Publication Data
US 2012/0110987 A1    May 10, 2012

(51) Int. Cl.
*F01N 3/00*    (2006.01)
*F01N 3/02*    (2006.01)
*F01N 5/02*    (2006.01)
*B01D 50/00*    (2006.01)
*B01D 53/34*    (2006.01)
*B01J 23/00*    (2006.01)
*B01J 23/10*    (2006.01)
*F01N 3/10*    (2006.01)

(52) U.S. Cl.
USPC ............. 60/297; 60/287; 60/299; 60/320; 422/180; 502/300; 502/304; 502/313

(58) Field of Classification Search
USPC ............ 60/297, 299, 311, 287, 320; 422/177, 422/180; 502/300, 304, 313
See application file for complete search history.

(56) References Cited

U.S. PATENT DOCUMENTS

| | | | |
|---|---|---|---|
| 2004/0115104 A1 | 6/2004 | Iizuka et al. | |
| 2006/0064969 A1 | 3/2006 | Yoshida et al. | |
| 2008/0302090 A1 * | 12/2008 | Yoshida et al. | 60/286 |
| 2010/0205947 A1 * | 8/2010 | Ogura et al. | 60/301 |

FOREIGN PATENT DOCUMENTS

| | | | |
|---|---|---|---|
| DE | 10339007 A1 * | 4/2004 | ............... F01N 3/10 |
| JP | A-2005-133610 | 5/2005 | |
| JP | A-2006-116431 | 5/2006 | |
| WO | WO 02/062468 A1 | 8/2002 | |
| WO | WO 2008/004493 A1 | 1/2008 | |
| WO | WO 2008143062 A1 * | 11/2008 | ............... B01J 23/58 |

OTHER PUBLICATIONS

International Search Report issued in Application No. PCT/JP2009/063536; Dated Oct. 27, 2009 (With Translation).

* cited by examiner

*Primary Examiner* — Audrey K Bradley
(74) *Attorney, Agent, or Firm* — Oliff PLC

(57) ABSTRACT

An internal combustion engine in which an $SO_x$ trap catalyst (13) for trapping $SO_x$ contained in the exhaust gas contains an oxygen adsorbing and releasing material (54) which can adsorb $SO_2$ contained in the exhaust gas and an $SO_x$ storage material (55) which can store $SO_x$ in the form of sulfates. The $SO_2$ which is contained in the exhaust gas is chemically adsorbed at the oxygen adsorbing and releasing material (54) without being oxidized. If the temperature of the $SO_x$ trap catalyst (13) becomes higher than the start temperature of adsorbed $SO_2$ movement, the $SO_2$ which is chemically adsorbed at the oxygen adsorbing and releasing material (54) is oxidized and stored in the form of sulfates in the $SO_x$ storage material (55).

10 Claims, 11 Drawing Sheets

(A)

(B)

(A)

(B)

(A)

COAT LAYER (B)

COAT LAYER

EXHAUST PURIFICATION SYSTEM OF INTERNAL COMBUSTION ENGINE

TECHNICAL FIELD

The present invention relates to an exhaust purification system of an internal combustion engine.

BACKGROUND ART

The fuel and lubrication oil which are used in an internal combustion engine contain sulfur. Therefore, the exhaust gas contains $SO_x$. In this regard, this $SO_x$ acts to greatly reduce the performance and durability of the exhaust gas purification catalyst and other post-treatment devices which are arranged inside of the engine exhaust passage. Therefore, the $SO_x$ in the exhaust gas is preferably removed.

Therefore, there is known an internal combustion engine which arranges inside an engine exhaust passage an $SO_x$ trap catalyst which can trap the $SO_x$ which is contained in the exhaust gas (see Patent Literature 1). Inside this $SO_x$ trap catalyst, mainly an alkali metal is carried dispersed. When the air-fuel ratio of the exhaust gas which flows into the $SO_x$ trap catalyst is lean, the $SO_x$ which is contained in the exhaust gas reacts with the nitrates which are present at the surface part of the $SO_x$ trap catalyst and is trapped in the form of sulfates. On the other hand, in this internal combustion engine, when the sulfates at the surface part of the $SO_x$ trap catalyst increase and the $SO_x$ trap rate starts to fall, the temperature of the $SO_x$ trap catalyst is held at the melting point of the nitrates of the alkali metal or more whereby the nitrates inside the $SO_x$ trap catalyst move to the $SO_x$ trap catalyst surface and concentrate there. If the nitrates concentrate at the $SO_x$ trap catalyst surface, the $SO_2$ in the exhaust gas reacts with the concentrated nitrates and is trapped well in the form of sulfates. Due to this, the $NO_x$ trap rate is restored.

CITATION LIST

Patent Literature

Patent Literature 1: WO2008/004493A1

SUMMARY OF INVENTION

Technical Problem

However, in this $SO_x$ trap catalyst, the surface part of the catalyst is covered by sulfates, so, blocked by the sulfates, the $SO_2$ in the exhaust gas can no longer diffuse inside of the $SO_x$ trap catalyst. As a result, despite the $SO_x$ trap catalyst continuing to have a sufficient trapping volume, $SO_2$ can no longer be trapped and therefore there is the problem that the trapping volume of the $SO_x$ trap catalyst cannot be sufficiently utilized.

In this way, the trapping volume of the $SO_x$ trap catalyst cannot be sufficiently made use of because the $SO_2$ which is contained in the exhaust gas is oxidized on the surface of the $SO_x$ trap catalyst and trapped in the form of sulfates on the surface part of the $SO_x$ trap catalyst. In this case, if $SO_2$ is not allowed to oxidize on the surface of the $SO_x$ trap catalyst, this $SO_2$ will not react with the nitrates and, therefore, will no longer be trapped on the surface part of the $SO_x$ trap catalyst in the form of sulfates, so this $SO_2$ can disperse within the $SO_x$ trap catalyst. Therefore, in this case, if $SO_2$ disperses within the $SO_x$ trap catalyst, then the $SO_2$ is trapped in the form of sulfates, the trapping volume of the $SO_x$ trap catalyst can be sufficiently utilized.

Solution to Problem

Therefore, in the present invention, an $SO_x$ trap catalyst for trapping $SO_x$ contained in exhaust gas is arranged in an engine exhaust passage, the $SO_x$ trap catalyst contains $SO_2$ adsorption-use oxides which can adsorb $SO_2$ contained in the exhaust gas and an $SO_x$ storage material which can store $SO_x$ in the form of sulfates, the $SO_x$ trap catalyst has a property of being able to adsorb $SO_2$ contained in the exhaust gas at the $SO_2$ adsorption-use oxides without oxidizing and has a property whereby $SO_2$ adsorbed at the $SO_2$ adsorption-use oxides is oxidized and is stored in the form of sulfates in the $SO_x$ storage material when a temperature of the $SO_x$ trap catalyst becomes higher than a start temperature of adsorbed $SO_2$ movement where the $SO_2$ adsorbed at the $SO_2$ adsorption-use oxides starts to move toward the $SO_x$ storage material, and, during engine operation, the temperature of the $SO_x$ trap catalyst is made to repeatedly change from less than the start temperature of adsorbed $SO_2$ movement to more than the start temperature of adsorbed $SO_2$ movement.

Advantageous Effects of Invention

It is possible to make sufficiently use of the trapping volume of an $SO_x$ trap catalyst for trapping $SO_x$.

DESCRIPTION OF EMBODIMENTS

Figure 1:
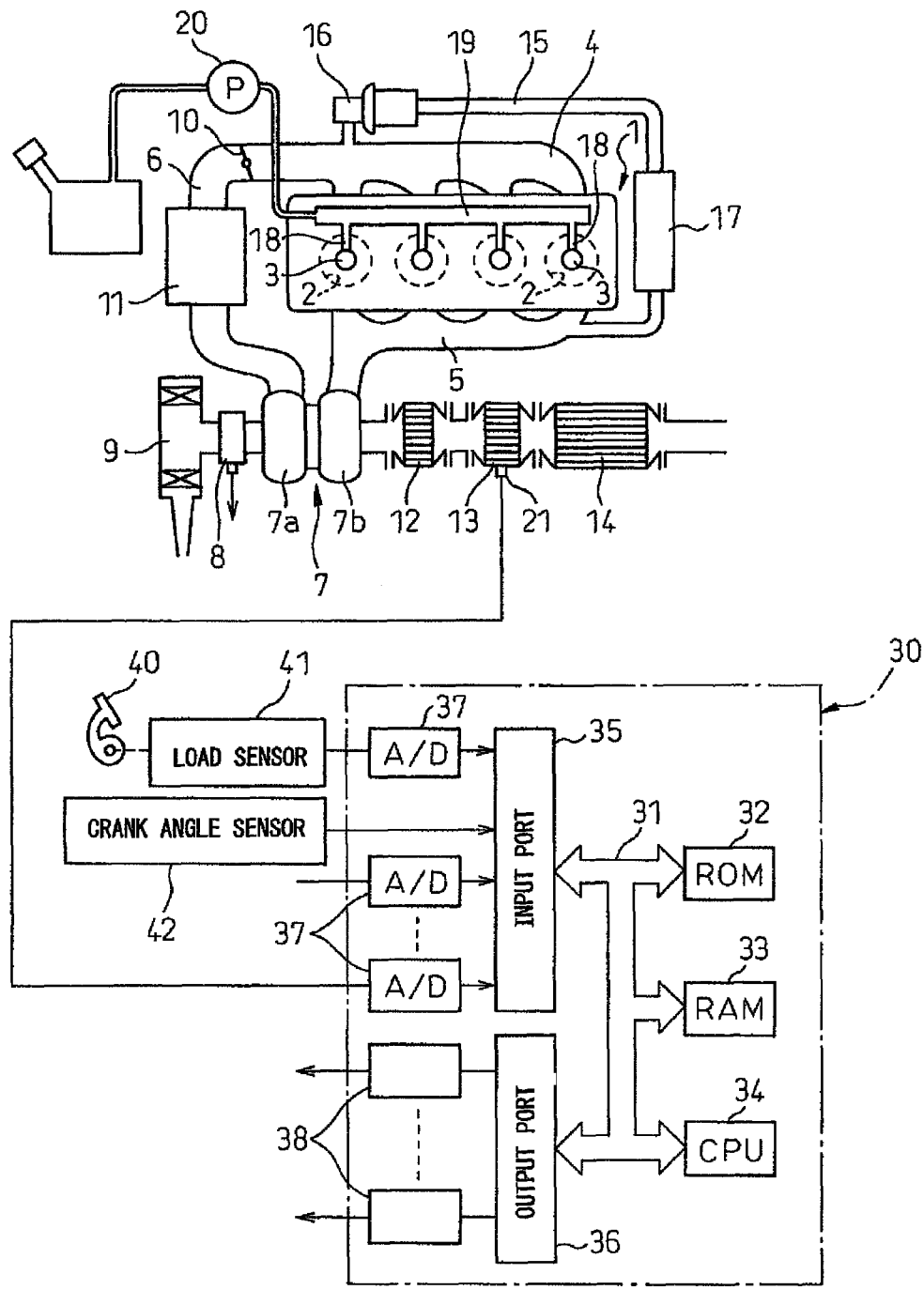
FIG. 1 is an overview of a compression ignition type internal combustion engine.

FIG. 1 is an overall view of a compression ignition type internal combustion engine.

Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7, while an inlet of the compressor 7a is connected through an intake air amount detector 8 to an air cleaner 9. Inside the intake duct 6, a throttle valve 10 driven by a step motor is arranged. Furthermore, around the intake duct 6, a cooling device 11 is arranged for cooling the intake air which flows through the inside of the intake duct 6. In the embodiment shown in FIG. 1, the engine cooling water is guided to the inside of the cooling device 11 where the engine cooling water is used to cool the intake air.

On the other hand, the exhaust manifold 5 is connected to an inlet of the exhaust turbine 7b of the exhaust turbocharger 7, while an outlet of the exhaust turbine 7b is connected to an inlet of the oxidation catalyst 12. An outlet of the oxidation catalyst 12 is connected to an inlet of the $SO_x$ trap catalyst 13, while an outlet of the $SO_x$ trap catalyst 13 is connected to an inlet of the NO storage catalyst 14.

The exhaust manifold 5 and the intake manifold 4 are connected to each other through an exhaust gas recirculation (below, called "EGR") passage 15. Inside of the EGR passage 15, an electronic control type EGR control valve 16 is arranged. Further, around the EGR passage 15, a cooling device 17 is arranged for cooling the EGR gas which flows through the inside of the EGR passage 15. In the embodiment which is shown in FIG. 1, the engine cooling water is guided to the inside of the cooling device 17 where the engine cooling water is used to cool the EGR gas. On the other hand, each fuel injector 3 is connected through a fuel feed tube 18 to a common rail 19. This common rail 19 is fed with fuel from an electronic control type variable discharge fuel pump 20. The fuel which is fed to the inside of the common rail 19 is fed through each fuel feed tube 18 to the fuel injector 3.

An electronic control unit 30 is comprised of a digital computer provided with a ROM (read only memory) 32, a RAM (random access memory) 33, a CPU (microprocessor) 34, an input port 35, and an output port 36, which are connected with each other by a bidirectional bus 31. The $SO_x$ trap catalyst 13 has a temperature sensor 21 attached to it for detecting the temperature of the $SO_x$ trap catalyst 13. The output signals of this temperature sensor 21 and intake air amount detector 8 are input through corresponding AD converters 37 to the input port 35.

An accelerator pedal 40 has a load sensor 41 connected to it which generates an output voltage proportional to the amount of depression L of the accelerator pedal 40. The output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, step motor for driving the throttle valve 10, EGR control valve 16, and fuel pump 20.

Now then, in a compression ignition type internal combustion engine, the air-fuel ratio of the exhaust gas which is exhausted from the engine is usually lean. At this time, the NO which is contained in the exhaust gas is stored in the NO storage catalyst 14. On the other hand, if the NO storage amount of the NO storage catalyst 14 approaches saturation, the air-fuel ratio of the exhaust gas which is exhausted from the engine is temporarily made rich. Due to this, the NO which is stored in the NO storage catalyst 14 is released and reduced.

In this case, if the exhaust gas which flows into the $NO_x$ storage catalyst 14 contains $SO_x$, this $SO_x$ is stored in the NO storage catalyst 14. As a result, the amount of NO which the NO storage catalyst 14 can store gradually declines and finally NO can no longer be stored. That is, the NO storage catalyst 14 suffers from $SO_x$ poisoning. Therefore, in the embodiment shown in FIG. 1, in this way, the NO storage catalyst 14 is prevented from suffering from $SO_x$ poisoning, so the $SO_x$ trap catalyst 13 is arranged upstream of the NO storage catalyst 14.

Figure 2:
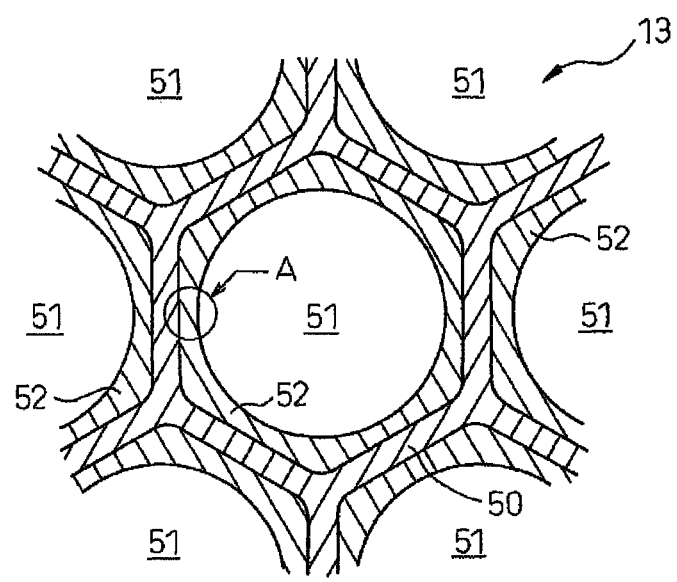
FIG. 2 is an enlarged cross-sectional view of an $SO_x$ trap catalyst.

FIG. 2 is an enlarged cross-sectional view of an $SO_x$ trap catalyst 13 in a cross-section vertical to the direction of flow of the exhaust gas. In FIG. 2, 50 indicates a substrate of a honeycomb structure which is formed from for example cordierite. Due to this substrate 50, a large number of exhaust gas passages 51 are formed extending straight in the direction of flow of the exhaust gas. The inner circumferences of the substrate 50 defining the exhaust gas passages 51 have coat layers 52 formed on them. An enlarged cross-sectional view of the coat layer 52 of the part shown by the arrow A in FIG. 2 is shown in FIG. 3.

Figure 3:
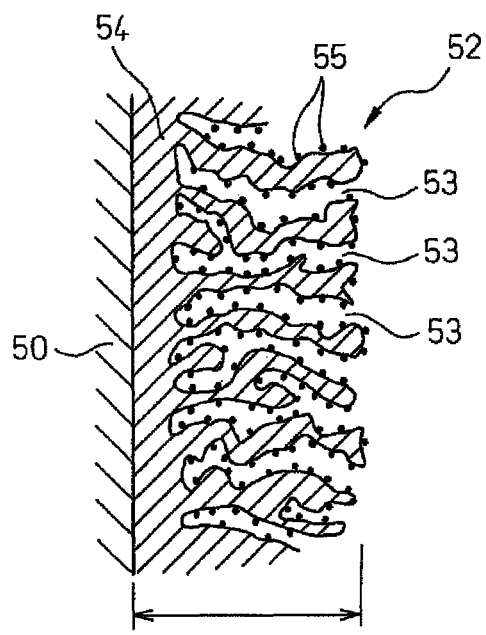
FIG. 3 is an enlarged cross-sectional view of a part A of FIG. 2.

As shown in FIG. 3, in this embodiment according to the present invention, the coat layer 52 is formed by the catalyst carrier 54 which has innumerable pores 53. In this embodiment, this catalyst carrier 54 is comprised 90 percent or more by ceria $CeO_2$. On the other hand, the surfaces of the pores 53, as shown by the black dots, have innumerable particles of $SO_x$ storage material 55 carried dispersed on them. As the ingredients forming this $SO_x$ storage material 55, at least one ingredient selected from an alkali metal such as potassium K, sodium Na, and cesium Cs and an alkali earth metal such as barium Ba and calcium Ca is used. In the example shown in FIG. 3, as the ingredients forming the $SO_x$ storage material 55, barium Ba and potassium K are used.

Figure 4:
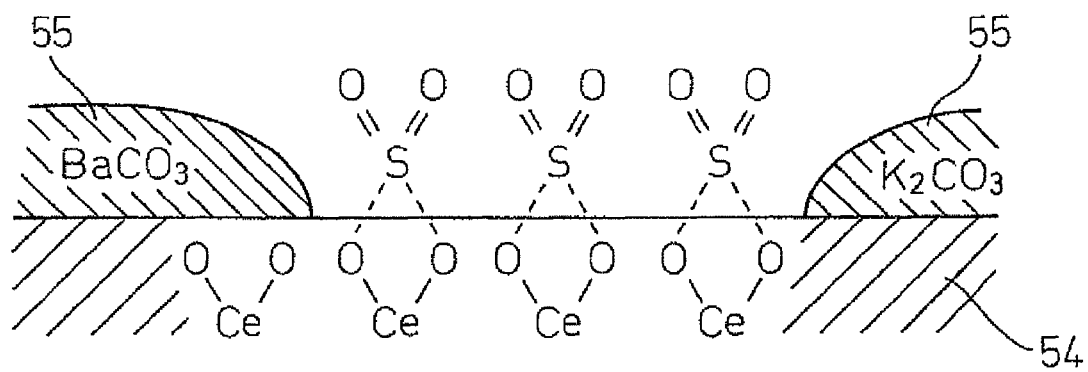
FIG. 4 is a view for explaining an adsorption action of $SO_2$.
Figure 4:
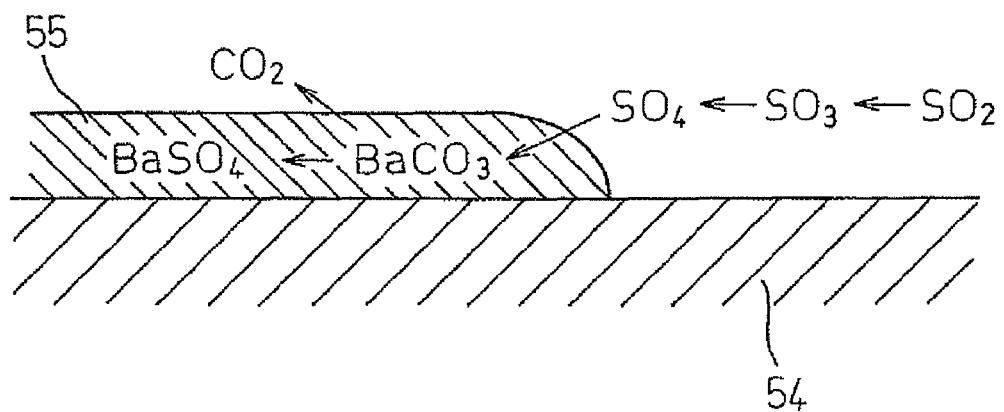

FIGS. 4(A) and 4(B) illustrate the surface part of the pore, that is, the surface part of the catalyst carrier 54. If the catalyst carrier 54 carries barium Ba and potassium K, these barium Ba and potassium K bond with the $CO_2$ in the atmosphere and become the carbonates $BaCO_3$ and $K_2CO_3$. Therefore, as shown in FIG. 4(A), the $SO_x$ storage material 55 which is carried on the catalyst carrier 54 takes the form of the carbonates $BaCO_3$ and $K_2CO_3$.

Next, the $SO_x$ trap mechanism according to the present invention will be explained while referring to FIGS. 4(A) and 4(B).

The majority of the $SO_x$ which is contained in the exhaust gas is $SO_2$. If this $SO_2$ contacts platinum or another precious metal catalyst, it is oxidized and becomes $SO_3$. $SO_2$, as $SO_2$, will not react with the carbonates $BaCO_3$ and $K_2CO_3$. If the $SO_2$ is oxidized and becomes $SO_3$, it reacts with the carbonates and becomes sulfates. That is, if $SO_2$ is oxidized, it is stored in the form of sulfates in the $SO_x$ storage material 55.

However, as shown in FIG. 3, in this embodiment of the present invention, the catalyst carrier 54 does not carry a precious metal catalyst such as platinum able to oxidize $SO_2$. Therefore, the $SO_2$ which is contained in exhaust gas enters the pores 53 without being oxidized. On the other hand, exhaust gas becomes an oxygen excess state. Therefore, the cerium Ce forming the catalyst carrier 54, as shown in FIG. 4(A), takes the form of ceria $CeO_2$.

$SO_2$ and ceria $CeO_2$ easily electrically bond, therefore if the $SO_2$ which enters into the pores 53 encounters ceria $CeO_2$, as shown in FIG. 4(A), the $SO_2$ is chemically adsorbed at the ceria $CeO_2$. That is, the $SO_2$ which enters into the pores 53 is chemically adsorbed at the catalyst carrier 54 inside of the pores 53. In this case, it is believed that the $SO_2$ is successively chemically adsorbed on the catalyst carrier 54 from the inlets of the pores 53 toward their deep parts. Therefore, finally, the $SO_2$ is chemically adsorbed on the catalyst carrier 54 down to the deepest parts of the pores 53. It is experimentally confirmed that $SO_2$ is adsorbed on the catalyst carrier 54 comprised of the ceria $CeO_2$ in this way.

On the other hand, if, in the state with the $SO_2$ chemically adsorbed at the catalyst carrier 54, the temperature of the $SO_x$ trap catalyst 13 is made to rise to about 200° C. or more, it is confirmed experimentally that the $SO_2$ is eliminated and the sulfates $BaSO_4$ and $K_2SO_4$ are produced. In this case, the process by which the $SO_2$ which chemically bonds with the ceria $CeO_2$ becomes the sulfates $BaSO_4$ and $K_2SO_4$ is not clear, but probably the following reaction occurs.

That is, if the temperature of the $SO_x$ trap catalyst 13 is raised to about 200° C. or more, the $SO_2$ which is chemically adsorbed at the ceria $CeO_2$ robs the oxygen from the ceria $CeO_2$ and is converted to $SO_3$ and then to $SO_4$. The cerium Ce from which the oxygen is robbed is reduced in valence from tetravalent to trivalent and becomes ceria $Ce_2O_3$. On the other hand, the acidic $SO_4$ produced, as shown in FIG. 4B, immediately moves to the nearby basic $SO_x$ storage material 55 or moves on the ceria, then reaches the $SO_x$ storage material 55. Sulfuric acid $SO_4$ has a stronger acidity than carbonic acid $CO_3$, therefore, if $SO_4$ reaches the carbonates $BaCO_3$ or $K_2CO_3$, the carbonic acid $CO_3$ which bonds with the barium Ba or potassium K is replaced with the sulfuric acid $SO_4$, so the sulfates $BaSO_4$ and $K_2SO_4$ are produced in the coat layer 52.

The sulfates $BaSO_4$ and $K_2SO_4$ are stable and hard to break down. Therefore, once sulfates are formed, the sulfates are held inside the coat layer 52 as they are as sulfates. That is, $SO_2$ is trapped in the form of sulfates inside of the $SO_x$ trap catalyst 13. In the present invention, the $SO_2$ which enters the pores 53 disperses over a wide range of the pores 53 and is chemically adsorbed on the catalyst carrier 54, so the $SO_x$ storage material 55 which is dispersed in the pores 53 is used overall for storing the $SO_2$. Therefore, the trapping volume of the $SO_x$ trap catalyst 13 can be sufficiently made use of.

Figure 5:
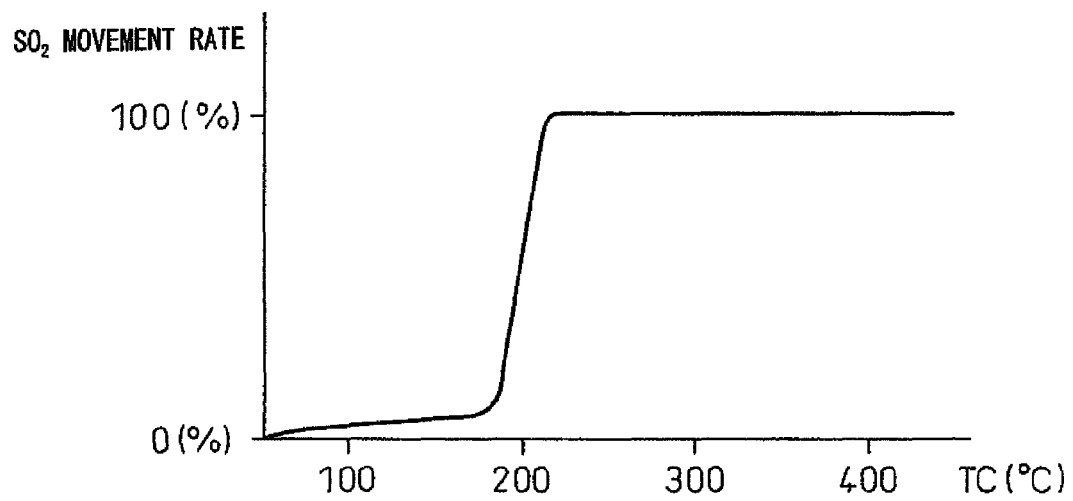
FIG. 5 is a view showing an $SO_2$ movement rate and a melted ratio of $KNO_3$.
Figure 5:
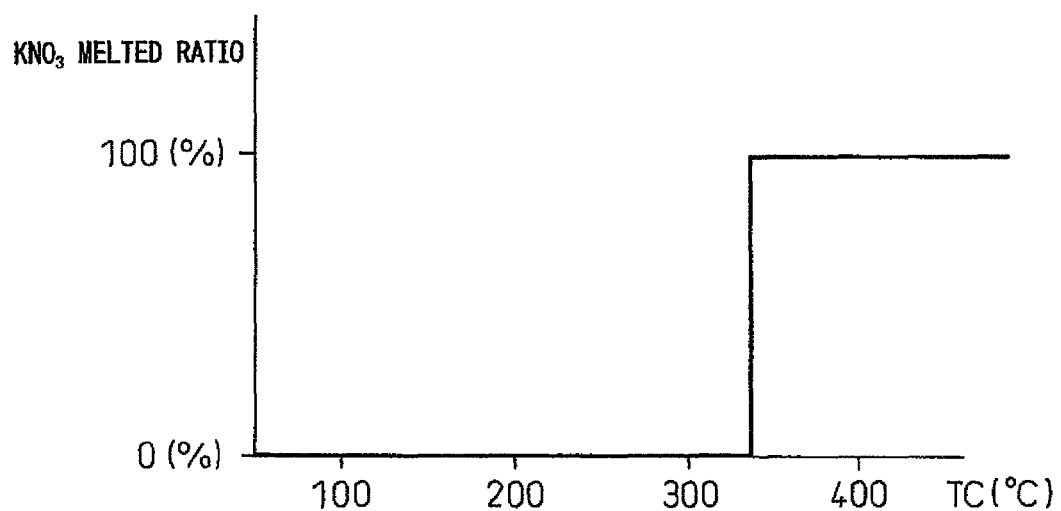

As explained above, it is believed that if the temperature of the $SO_x$ trap catalyst 13 exceeds 200° C., the chemically adsorbed $SO_2$ starts to move toward the $SO_x$ storage material 55. FIG. 5(A) shows the relationship derived from the experiments between the movement rate of the $SO_2$ and the temperature TC of the $SO_x$ trap catalyst 13. From FIG. 5(A), it will be understood that when the temperature TC of the $SO_x$ trap catalyst 13 is about 200° C. or less, there is almost no movement of the adsorbed $SO_2$ toward the $SO_x$ storage material 55 and that if the temperature TC of the $SO_x$ trap catalyst 13 exceeds about 200° C., substantially all of the adsorbed $SO_2$ moves toward the $SO_x$ storage material 55.

The temperature TC of the $SO_x$ trap catalyst 13 when the adsorbed $SO_2$ starts to move toward the $SO_x$ storage material 55 is called the start temperature of adsorbed $SO_2$ movement in the present specification. This start temperature of adsorbed $SO_2$ movement is the temperature determined from the chemical adsorption energy of $SO_2$. In this embodiment of the present invention, this start temperature of adsorbed $SO_2$ movement is about 200° C. as will be understood from FIG. 5(A).

Now then, to make the $SO_2$ contained in the exhaust gas be suitably chemically adsorbed, it is preferable to form the catalyst carrier 54 from an oxygen adsorbing and releasing material which changes in oxidation state in exhaust gas such as ceria. It is also possible to use iron Fe in addition to cerium Ce as the metal forming such an oxygen adsorbing and releasing material. This iron Fe also takes the two oxidation states FeO and $Fe_2O_3$ which differ in valence in exhaust gas.

Further, instead of a metal oxide such as ceria or iron oxide, it is also possible to use palladium Pd which takes the two oxidation states Pd and PdO differing in valences in exhaust gas. Further, it is also possible to use alumina $Al_2O_5$ which does not change in valence in exhaust gas, but has the action of adsorbing $SO_2$.

That is, if expressed to include all of these, in the present invention, $SO_2$ adsorption-use oxides which are able to adsorb $SO_2$ are used for adsorbing the $SO_2$. In this embodiment of the present invention, the $SO_2$ adsorption-use oxides are comprised of metal oxides. As explained above, the metal oxides are preferably comprised of an oxygen adsorbing and releasing material which changes in oxidation state in exhaust gas.

When ceria is used as the $SO_2$ adsorption-use oxides and this ceria accounts for 90 percent or more of the catalyst carrier 54, as explained above, the start temperature of adsorbed $SO_2$ movement becomes about 200° C. However, this start temperature of adsorbed $SO_2$ movement changes depending on the $SO_2$ adsorption-use oxides used and the amount of use. Further, depending on the $SO_2$ adsorption-use oxides used and the amount of use, the amount of movement of the $SO_2$ does not rapidly rise and slowly rises as shown in FIG. 5(A) with respect to the rise of the temperature TC of the $SO_x$ trap catalyst 13. In this case, the catalyst temperature TC when the $SO_2$ movement rate rises to a certain ratio, for example up to 50 percent, is made the start temperature of adsorbed $SO_2$ movement. That is, the start temperature of adsorbed $SO_2$ movement in the present invention is the temperature which is preset as the temperature most suitable as the temperature representing the start temperature of $SO_2$ movement. This start temperature of adsorbed $SO_2$ movement changes in various ways in accordance with the adsorption-use oxides used and the amount of use.

On the other hand, as explained above, in this embodiment of the present invention, a precious metal catalyst such as platinum able to oxidize $SO_2$ is not carried on the catalyst carrier 54. However, even if a small amount of $SO_2$ is oxidized, if the trapping volume of the $SO_x$ trap catalyst 13 can be sufficiently used, it is possible to carry a precious metal catalyst such as a small amount of platinum on the catalyst carrier 54.

Now then, when the temperature of the $SO_x$ trap catalyst 13 is lower than the start temperature of adsorbed $SO_2$ movement, the $SO_2$ continues to be adsorbed on the $SO_2$ adsorption-use oxides, that is, the catalyst carrier 54. As opposed to this, if the temperature of the $SO_x$ trap catalyst 13 rises to more than the start temperature of adsorbed $SO_2$ movement, the adsorbed $SO_2$ is converted to sulfates.

If the adsorbed $SO_2$ is converted to sulfates, the $SO_2$ adsorption amount becomes zero and the ceria gradually changes from $Ce_2O_3$ to $CeO_2$. When the temperature of the $SO_x$ trap catalyst 13 is higher than the start temperature of adsorbed $SO_2$ movement, it is believed that the $SO_2$ starts to move and becomes sulfates just when starting to be adsorbed at the catalyst carrier 54. If the temperature of the $SO_x$ trap catalyst 13 exceeds the start temperature of adsorbed $SO_2$ movement, then becomes less than the start temperature of adsorbed $SO_2$ movement, the adsorption action of $SO_2$ on the catalyst carrier 54 is started again.

In this way, the $SO_2$ adsorbed at the catalyst carrier 54 when the temperature of the $SO_x$ trap catalyst 13 is lower than the start temperature of adsorbed $SO_2$ movement is converted to sulfates when the temperature of the $SO_x$ trap catalyst 13 becomes more than the start temperature of adsorbed $SO_2$ movement. This action of conversion of adsorbed $SO_2$ to sulfates is repeated and the $SO_2$ in the exhaust gas is trapped in the form of sulfates at the $SO_x$ trap catalyst 13. Repeating the action of conversion of adsorbed $SO_2$ to sulfates to enable continued adsorption of the $SO_2$ in the exhaust gas in the $SO_x$ trap catalyst 13 is one feature of the present invention.

That is, in the present invention, the $SO_x$ trap catalyst 13 contains $SO_2$ adsorption-use oxides 54 which can adsorb $SO_2$ contained in exhaust gas and an $SO_x$ storage material 55 which can store $SO_x$ in the form of sulfates, the $SO_x$ trap catalyst 13 has the property of being able to adsorb $SO_2$ contained in exhaust gas at the $SO_2$ adsorption-use oxides 54 without oxidizing it and has the property whereby $SO_2$ adsorbed at the $SO_2$ adsorption-use oxides 54 is oxidized and is stored in the form of sulfates in the $SO_x$ storage material 55 when the temperature of the $SO_x$ trap catalyst 13 becomes higher than the start temperature of adsorbed $SO_2$ movement where the $SO_2$ adsorbed at the $SO_2$ adsorption-use oxides 54 starts to move toward the $SO_x$ storage material 55, and, during engine operation, the temperature of the $SO_x$ trap catalyst 13 is made to repeatedly change from less than the start temperature of adsorbed $SO_2$ movement to more than the start temperature of adsorbed $SO_2$ movement.

In this regard, the amount of $NO_x$ in the exhaust gas is far greater than the amount of $SO_x$. Therefore, the $NO_x$ which is adsorbed at the catalyst carrier 54 can react with the carbonates $BaSO_4$ and $K_2SO_4$ in the coat layer 52. In this case, the carbonates $BaSO_4$ and $K_2SO_4$ respectively become nitrates $Ba(NO_3)_2$ and $KNO_3$. In this regard, in this case, if the carbonates of the alkali metal become nitrates, the melting point greatly falls. For example, if referring to the potassium K, the melting point of $K_2CO_3$ is 891° C., while the melting point of $KNO_3$ becomes 333° C. By way of note, the melting point of $K_2SO_4$ is an extremely high 1069° C.

FIG. 5(B) shows the relationship between the melting ratio of the nitrates $KNO_3$ and the temperature TC of the $SO_x$ trap catalyst 13. As will be understood from FIG. 5(B), the nitrates $KNO_3$ become molten in state if the temperature TC of the $SO_x$ trap catalyst 13 becomes 333° C. or more. However, if the $SO_x$ trap catalyst 13 becomes the molten state in this way, when a large amount of sulfuric acid ions $SO_4^{2-}$ are formed at the surface part of the coat layer 52, there is the danger that the nitrates $KNO_3$ will move toward the surface part of the coat layer 52 and concentrate at the surface part of the coat layer 52. If the nitrates concentrate at the surface part of the coat layer 52 in this way, the problem arises that the surface part of the coat layer 52 will be covered by the sulfates, so the $SO_2$ in the exhaust gas can no longer enter the pores 53. Therefore, it can be said preferable that the temperature of the $SO_x$ trap catalyst 13 be maintained at 333° C. or less, that is, at the melting point or, less of the nitrates of the alkali metal formed inside of the coat layer 52.

Figure 6:
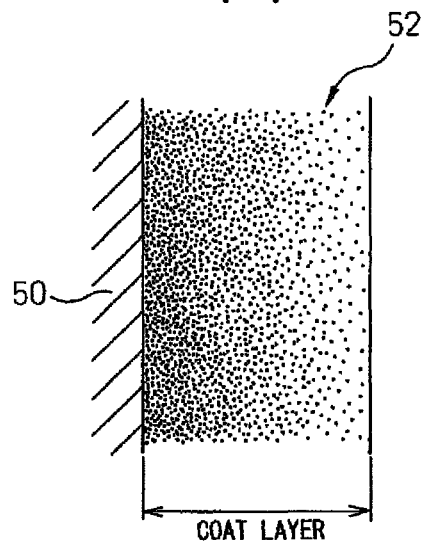
FIG. 6 is a view showing a coat layer of an $SO_x$ trap catalyst.
Figure 6:
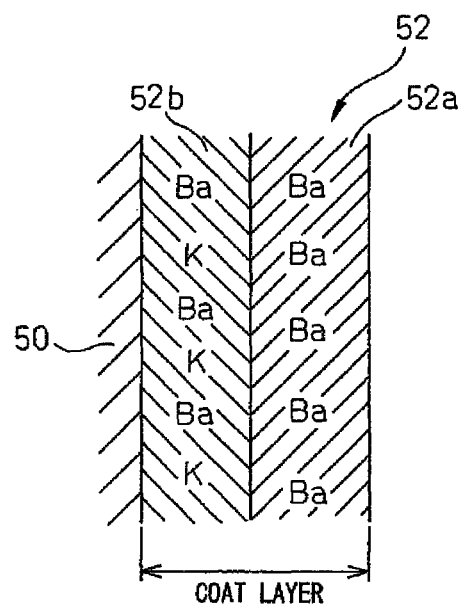

FIGS. 6(A) and 6(B) show a modification of the coat layer 52. In this modification, compared with the surface side of the coat layer 52, the deep parts of the coat layer 52 are raised in basicity. That is, to make sufficient use of the trapping volume of the $SO_x$ trap catalyst 13, it is necessary to make the $SO_2$ in the exhaust gas penetrate as much as possible to the deep parts of the insides of the pores 53. On the other hand, the acidic $SO_2$ is drawn in the direction of a stronger basicity. Therefore, in the modification shown in FIG. 6(A), the basicity is strengthened the further to the deep parts of the coat layer 52. Note that, the shading in FIG. 6(A) shows the density of the $SO_x$ storage material 55. Therefore, in the modification shown in FIG. 6(A), the basicity is strengthened the further to the deep parts of the coat layer 52.

In the modification shown in FIG. 6(B), the coat layer 52 is comprised of an upper layer 52*a* and a lower layer 52*b*. The lower layer 52*b* is made higher in basicity than the upper layer 52*a*. In the modification shown in FIG. 6(B), inside the upper layer 52*a*, an alkali earth metal, for example, barium Ba, is dispersed, while inside the lower layer 52*b*, an alkali metal stronger in basicity than an alkali earth metal, for example, potassium K, is dispersed. Note that, in the modification shown in FIG. 6(B), when the lower layer 52*b* including potassium K is formed, then the upper layer 52*a* including barium Ba is formed, part of the barium Ba enters inside the lower layer 52*b*, so the lower layer 52*b* includes barium Ba in addition to potassium K.

Figure 7:
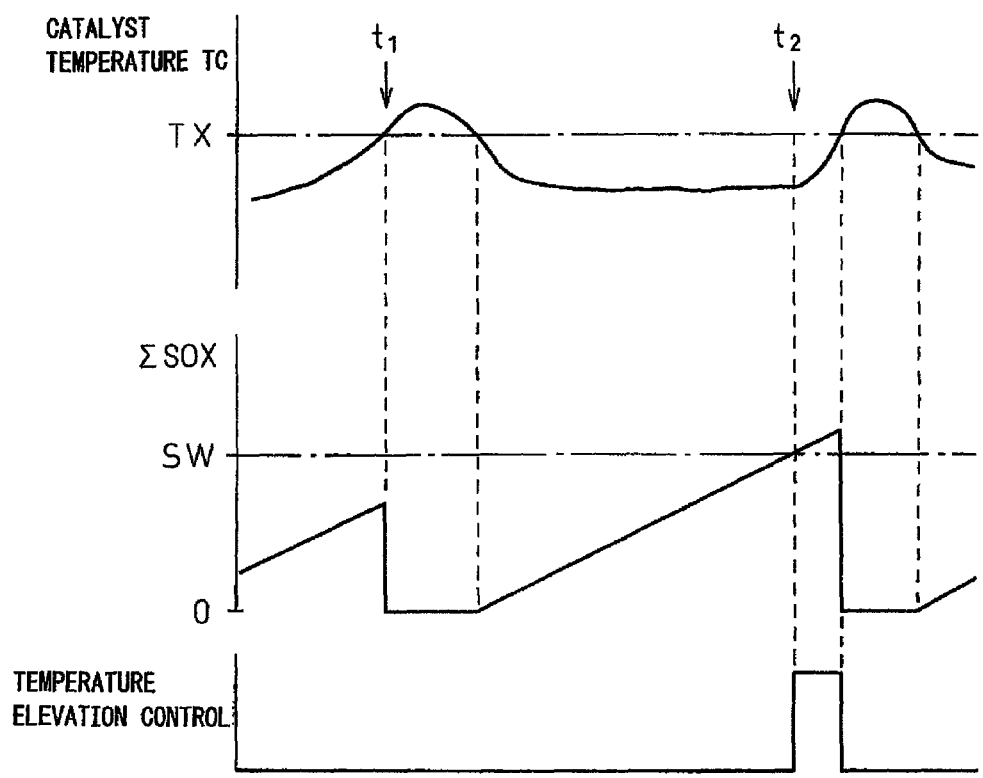
FIG. 7 is a time chart for explaining temperature elevation control of an $SO_x$ trap catalyst.
Figure 8:
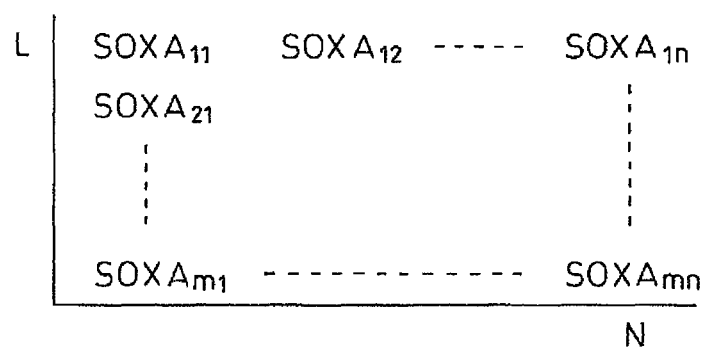
FIG. 8 is a view showing a map of an $SO_x$ amount SOXA exhausted per unit time.
Figure 9:
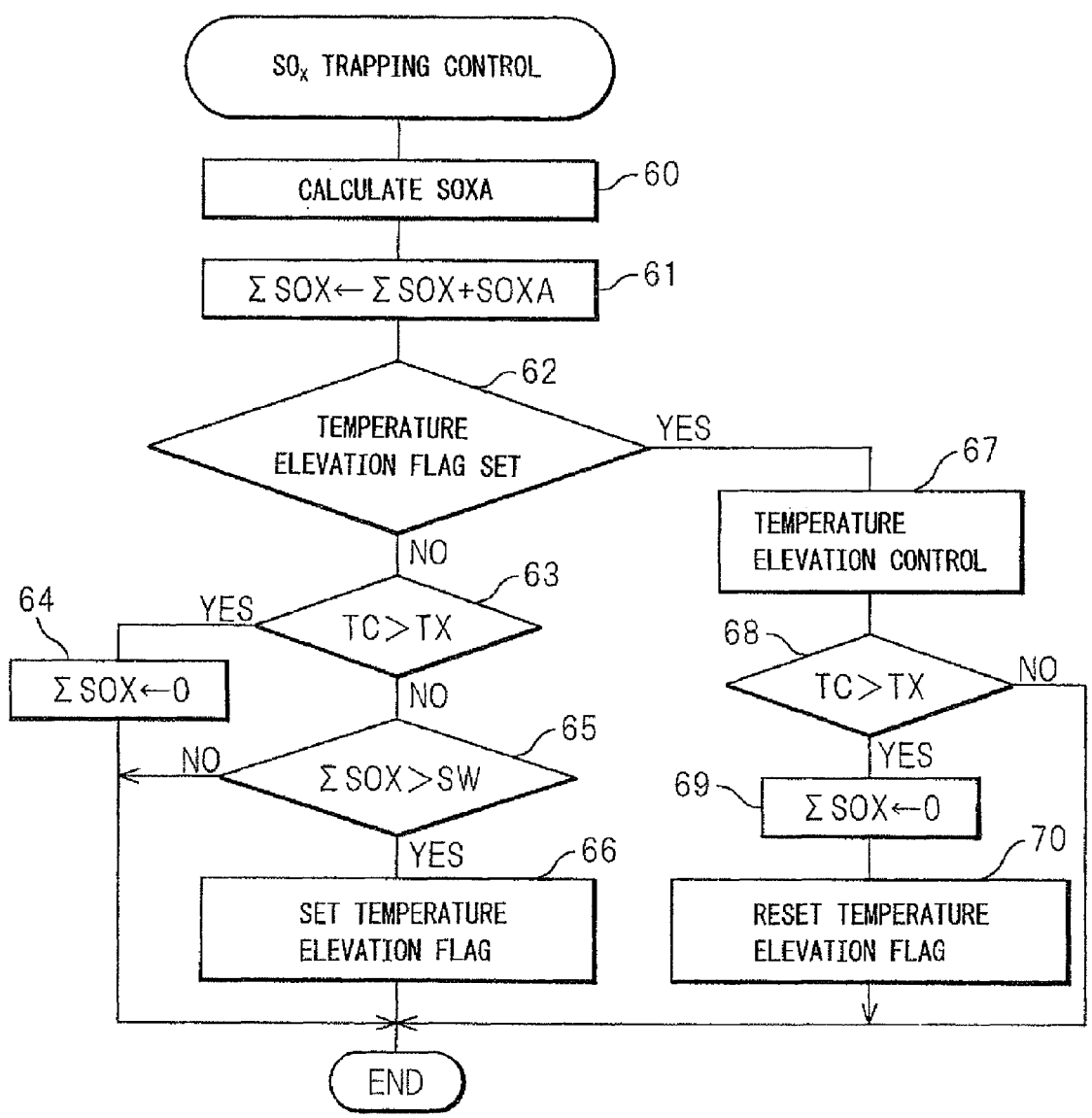
FIG. 9 is a flow chart for $SO_x$ trapping control.

FIG. 7 to FIG. 9 show one example of the $SO_x$ trapping control. First, referring to FIG. 7, FIG. 7 shows the change of the temperature TC of the $SO_x$ trap catalyst 13, the change of the adsorption amount ΣSOX of $SO_2$ which is adsorbed on the catalyst carrier 54 of the $SO_x$ trap catalyst 13, and the timing of temperature elevation control for raising the temperature TC of the $SO_x$ trap catalyst 13. Note that, in FIG. 7, TX shows the start temperature of adsorbed $SO_2$ movement, while SW shows the allowable limit value of the $SO_2$ adsorption amount.

The $SO_2$ adsorption amount ΣSOX is calculated by cumulatively adding the $SO_x$ amount SOXA which is exhausted from the engine per unit time. This $SO_x$ amount SOXA is for example stored as a function of the engine load L and engine speed N in the form of a map as shown in FIG. 8 in advance in the ROM 32. Further, the temperature elevation control is performed by for example raising the exhaust temperature by injecting additional fuel inside the combustion chamber 2 in addition to the main fuel or by retarding the injection timing of the main fuel.

As shown by the timing $t_1$ of FIG. 7, when the $SO_2$ adsorption amount ΣSOX is the allowable limit value SW or less, if the temperature TC of the $SO_x$ trap catalyst 13 exceeds the start temperature of adsorbed $SO_2$ movement TX, the $SO_2$ adsorption amount ΣSOX is made zero, then the $SO_2$ adsorption amount ΣSOX is maintained at zero while the catalyst temperature TC is the start temperature of adsorbed $SO_2$ movement TX or more. On the other hand, as shown by the timing $t_2$ of FIG. 7, when the catalyst temperature TC is the start temperature of adsorbed $SO_2$ movement TX or less, if the $SO_2$ adsorption amount ΣSOX exceeds the allowable limit value SW, the $SO_2$ adsorption amount approaches saturation, so the adsorbed $SO_2$ has to be converted to sulfates. Therefore, at this time, the temperature elevation control of the $SO_x$ trap catalyst 13 is performed until the catalyst temperature TC exceeds the start temperature of adsorbed $SO_2$ movement TX.

That is, in this $SO_x$ trapping control, when the temperature TC of the $SO_x$ trap catalyst 13 does not exceed the start temperature of adsorbed $SO_2$ movement TX for a predetermined time period, the temperature elevation action of the $SO_x$ trap catalyst 13 is performed so that the temperature TC of the $SO_x$ trap catalyst 13 exceeds the start temperature of adsorbed $SO_2$ movement TX. In this case, in the example shown in FIG. 7, the above-mentioned predetermined time period is made the time period from when the $SO_2$ adsorption amount ΣSOX starts to rise to when the allowable limit value SW is reached. That is, in the example shown in FIG. 7, calculating means for calculating the $SO_2$ adsorption amount ΣSOX is provided. When the calculated $SO_2$ adsorption amount ΣSOX exceeds the predetermined allowable limit value SW, the temperature elevation action of the $SO_x$ trap catalyst 13 is performed.

FIG. 9 shows the $SO_x$ trapping control routine. Note that, this routine is executed by interruption every predetermined time.

Referring to FIG. 9, first, at step 60, the $SO_x$ amount SOXA exhausted per unit time shown in FIG. 8 is calculated. Next, at step 61, the $SO_2$ adsorption amount ΣSOX is increased by SOXA. Next, at step 62, it is judged if the temperature elevation flag which is set when raising the temperature of the $SO_x$ trap catalyst 13 has been set. When the temperature elevation flag is not set, the routine proceeds to step 63 where it is judged if the temperature TC of the $SO_x$ trap catalyst 13 is higher than the start temperature of adsorbed $SO_2$ movement TX. When TC>TX, the routine proceeds to step 64 where ΣSOX is cleared.

As opposed to this, when it is judged at step 63 that TC≤TX, the routine proceeds to step 65 where it is judged if the $SO_2$ adsorption amount ΣSOX exceeds the allowable limit value SW. When ΣSOX>SW, the routine proceeds to step 66 where the temperature elevation flag is set. If the temperature elevation flag is set, at the next processing cycle, the routine proceeds from step 62 to step 67 where the temperature elevation control of the $SO_x$ trap catalyst 13 is performed. Next, at step 68, it is judged if the temperature TC of the $SO_x$ trap catalyst 13 becomes higher than the start temperature of adsorbed $SO_2$ movement TX. When TC>TX, the routine proceeds to step 69 where ΣSOX is clear, next, at step 70, the temperature elevation flag is reset.

Figure 10:
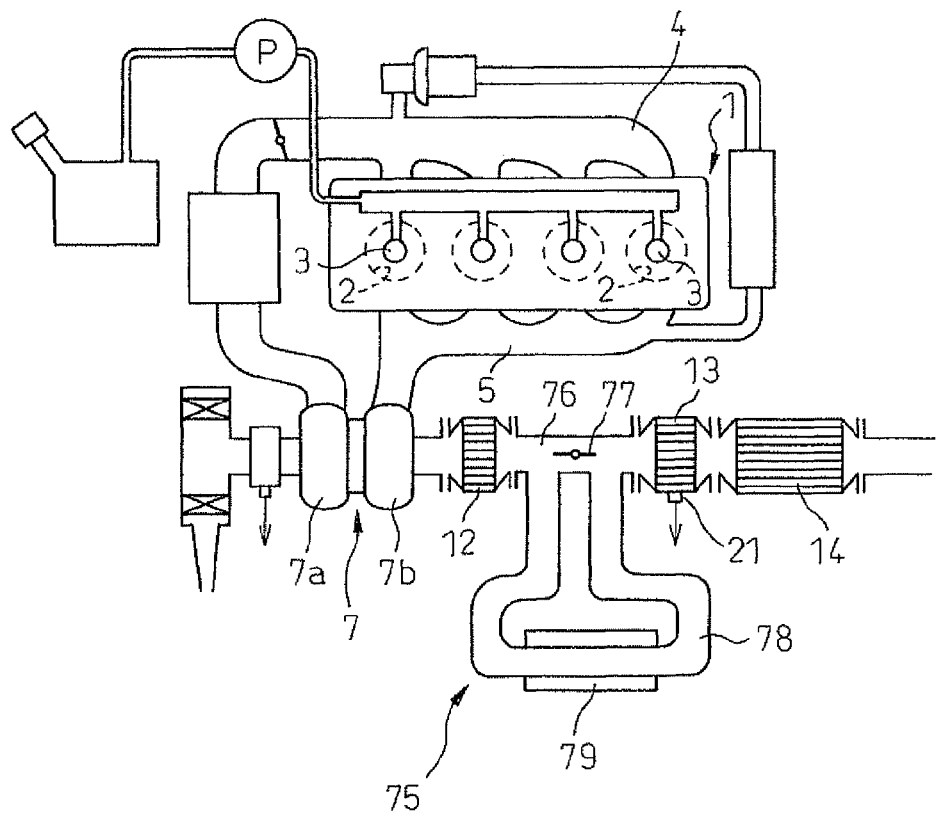
FIG. 10 is an overview showing another embodiment of a compression ignition type internal combustion engine.
Figure 11:
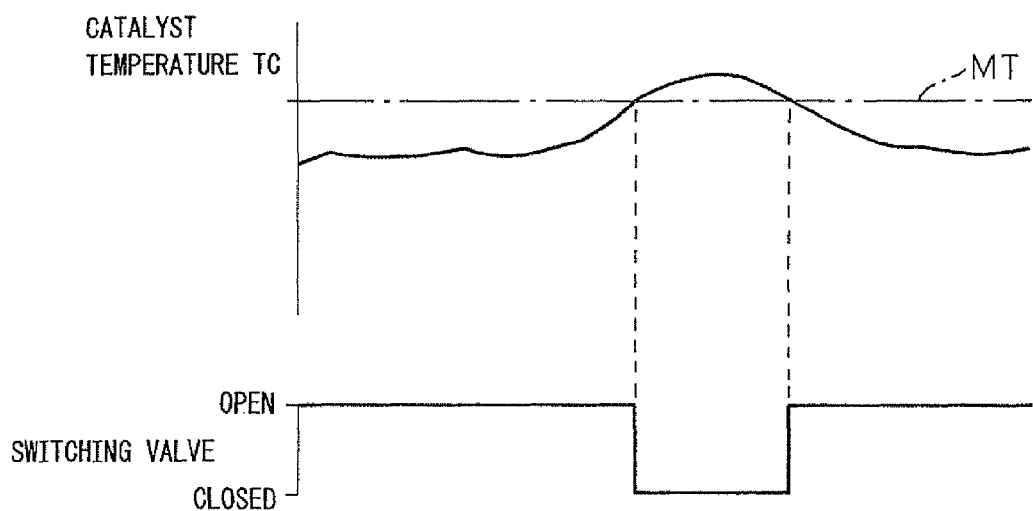
FIG. 11 is a time chart showing operational control of a switching valve.
Figure 12:
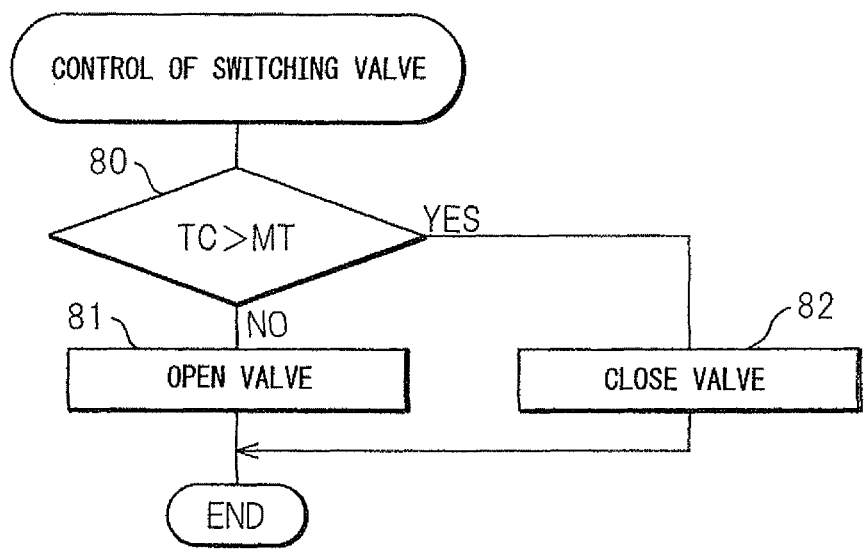
FIG. 12 is a flow chart for control of a switching valve.

FIG. 10 to FIG. 12 show another embodiment. As explained above, if the nitrates of the alkali metal formed in the coat layer 52 become the molten state, there is the danger that the $SO_2$ is prevented from entering the bores 53. Therefore, the temperature of the $SO_x$ trap catalyst 13 is preferably maintained at the melting point of the nitrates of the alkali metal or less. Therefore, in this embodiment, when an alkali metal is used as the $SO_x$ storage material 55, the temperature of the $SO_x$ trap catalyst 13 is maintained at the melting point of the nitrates of the alkali metal or less.

In this way, to maintain the temperature of the $SO_x$ trap catalyst 13 at the melting point of the nitrates of the alkali metal or less, in the embodiment shown in FIG. 10, a cooling device 75 is provided for cooling the exhaust gas which flows into the $SO_x$ trap catalyst 13 when the temperature of the $SO_x$ trap catalyst 13 exceeds the melting point of the nitrates of the alkali metal or might exceed it.

That is, as shown in FIG. 10, in this embodiment, the exhaust pipe 76 which connects the outlet of the oxidation catalyst 12 and the inlet of the $SO_x$ trap catalyst 13 is provided inside it with a switching valve 77. The inside of the exhaust pipe 76 upstream of the switching valve 77 and the inside of the exhaust pipe 76 downstream of the switching valve 77 are connected by a bypass pipe 78. This bypass pipe 78 is arranged so as to be cooled by the streaming air. To increase the cooling action by the streaming air, fins 79 are formed at the outer circumference of the bypass pipe 78. In the embodiment shown in FIG. 10, this bypass pipe 78 forms the cooling device 75.

FIG. 11 shows the changes in the temperature TC of the $SO_x$ trap catalyst 13 and the opening out closing action of the switching valve 77. Note that, in FIG. 11, MT shows a maximum allowable temperature which is slightly lower than the melting point of the nitrates of the alkali metal i.e., a maximum allowable temperature slightly lower than the melting point 333° C. of the nitrates of the potassium K in the embodiment of the present invention. As shown in FIG. 11, when the catalyst temperature TC is lower than the maximum allowable temperature MT, the switching valve 77 is made to open as shown in FIG. 10. At this time, the exhaust gas does not flow through the inside of the bypass pipe 78, but flows through the inside of the exhaust pipe 76 and flows inside of the $SO_x$ trap catalyst 13. As opposed to this, if the catalyst temperature TC becomes higher than the maximum allowable temperature MT, the switching valve 77 is closed. At this time, the exhaust gas flows through the bypass pipe 78 and cooled, then flows into the $SO_x$ trap catalyst 13.

FIG. 12 shows the control routine of the switching valve. Referring to FIG. 12, first, at step 80, it is judged if the temperature TC of the $SO_x$ trap catalyst 13 is higher than the maximum allowable temperature MT. When TC≤MT, the routine proceeds to step 81 where the switching valve 77 is opened. As opposed to this, when TC>MT, the routine proceeds to step 82 where the switching valve 77 is made to close.

Figure 13:
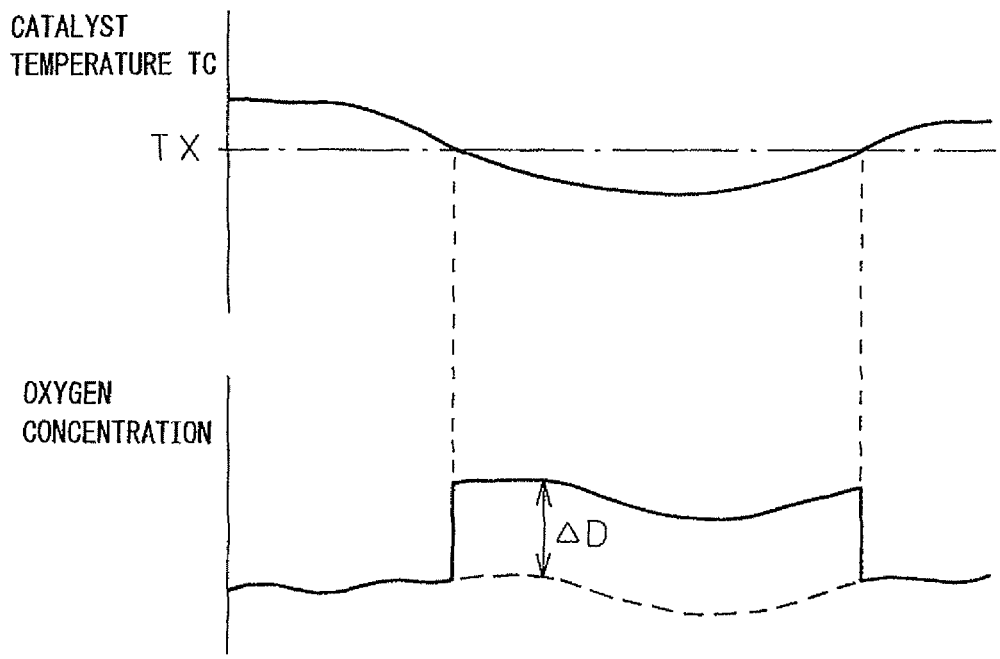
FIG. 13 is a time chart showing changes in the oxygen concentration.

FIG. 13 shows another embodiment. FIG. 13 shows the changes in the temperature TC of the $SO_x$ trap catalyst 13 and the changes in the concentration of oxygen in the exhaust gas which flows into the $SO_x$ trap catalyst 13. As shown in FIG. 13, in this embodiment, when the catalyst temperature TC is lower than the start temperature of adsorbed $SO_2$ movement TX, the concentration of oxygen in the exhaust gas which flows into the $SO_x$ trap catalyst 13 is increased by exactly ΔD.

That is, the $SO_2$ in the exhaust gas electrically bonds with the oxygen in the catalyst carrier 54 to thereby chemically be adsorbed at the catalyst carrier 54, so the more the concentration of oxygen in the catalyst carrier 54 is increased, the more the adsorption action of $SO_2$ is promoted. In this case, the concentration of oxygen in the catalyst carrier 54 increases the higher the concentration of oxygen in the exhaust gas which flows into the $SO_x$ trap catalyst 13. For example, when forming the catalyst carrier 54 from cerium Ce, the ceria changes from $Ce_2O_3$ to $CeO_2$, which has a higher adsorption ability with respect to $SO_2$, the higher the concentration of oxygen in the exhaust gas.

Therefore, in this embodiment, when the temperature of the $SO_x$ trap catalyst 13 is the start temperature of adsorbed $SO_2$ movement TX or less, the concentration of oxygen in the exhaust gas which flows into the $SO_x$ trap catalyst 13 is increased to promote the adsorption action of $SO_2$.

Figure 14:
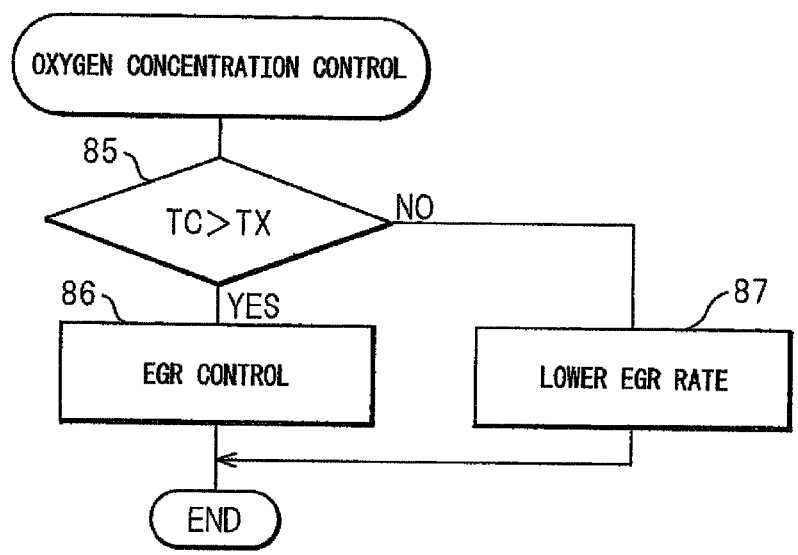
FIG. 14 is a flow chart for control of the oxygen concentration.

FIG. 14 shows an example of an oxygen concentration control routine where, as shown in FIG. 13, when the catalyst temperature TC is lower than the start temperature of adsorbed $SO_2$ movement TX, the concentration of oxygen in the exhaust gas which flows into the $SO_x$ trap catalyst 13 is increased.

Referring to FIG. 14, first, at step 85, it is judged if the temperature TC of the $SO_x$ trap catalyst 13 is higher than the start temperature of adsorbed $SO_2$ movement TX. When TC>TX, the routine proceeds to step 86 where the opening degree of the EGR control valve 16 is controlled so that the EGR rate becomes a predetermined EGR rate. As opposed to this, when TC≤TX, the routine proceeds to step 87 where the EGR rate is lowered or the feed of EGR gas is made to stop. In this way, if the EGR rate is made to fall or the feed of EGR gas is made to stop, the oxygen concentration in the exhaust gas is raised.

Figure 15:
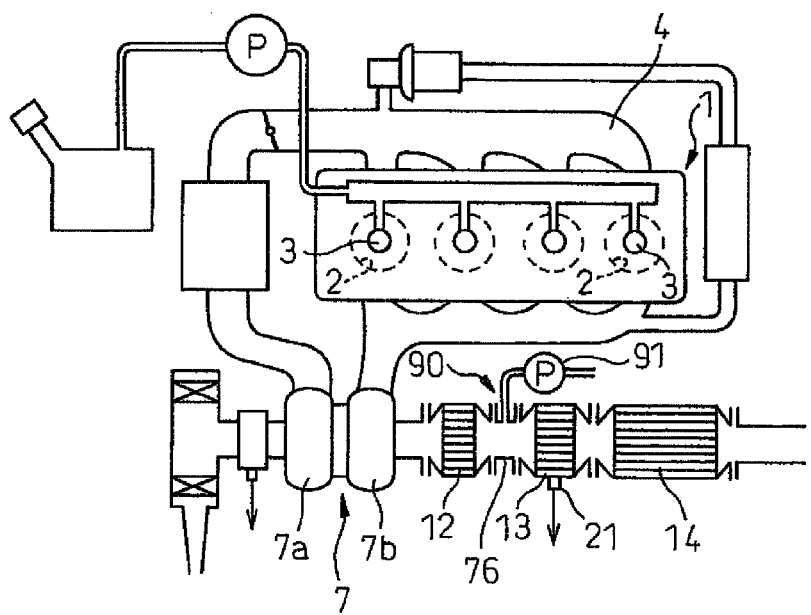
FIG. 15 is an overview showing still another embodiment of a compression ignition type internal combustion engine.
Figure 16:
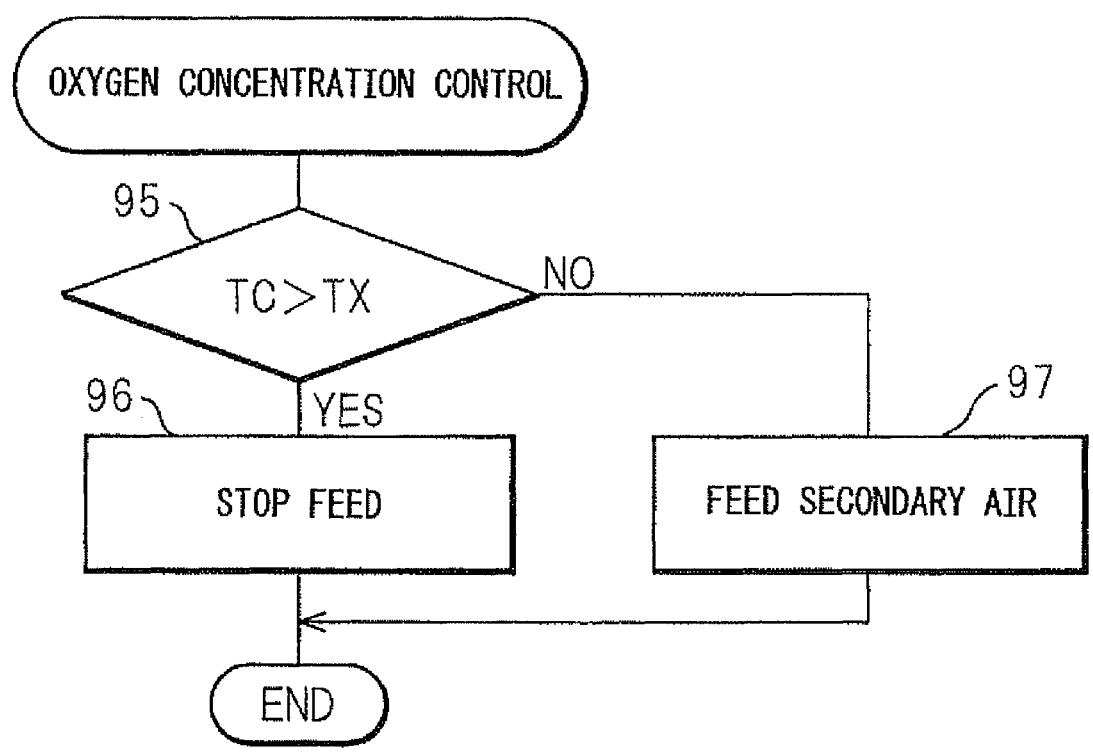
FIG. 16 is a flow chart for control of the oxygen concentration.

FIG. 15 and FIG. 16 show another example of increasing the concentration of oxygen in the exhaust gas which flows into the $SO_x$ trap catalyst 13 when, as shown in FIG. 13, the catalyst temperature TC is lower than the start temperature of adsorbed $SO_2$ movement TX. In this example, a secondary air feed device 90 is provided for feeding secondary air to the inside of the exhaust pipe 76 upstream of the $SO_x$ trap catalyst 13 using an air pump 91. The fed secondary air is used to raise the concentration of oxygen in the exhaust gas which flows into the $SO_x$ trap catalyst 13.

FIG. 16 shows the oxygen concentration control routine.

Referring to FIG. 16, first, at step 95, it is judged if the temperature TC of the $SO_x$ trap catalyst 13 is higher than the start temperature of adsorbed $SO_2$ movement TX. When TC>TX, the routine proceeds to step 96 where the feed of secondary air is stopped. As opposed to this, when TC≤TX, the routine proceeds to step 97 where secondary air is fed, whereby the oxygen concentration in the exhaust gas which flows into the $SO_x$ trap catalyst 13 is raised.

REFERENCE SIGNS LIST

4 . . . intake manifold
5 . . . exhaust manifold
12 . . . oxidation catalyst
13 . . . $SO_x$ trap catalyst
14 . . . $NO_x$ storage catalyst
50 . . . substrate
51 . . . exhaust gas passage
52 . . . coat layer
53 . . . pores
54 . . . catalyst carrier
55 . . . $SO_x$ storage material

The invention claimed is:

1. An exhaust purification system of an internal combustion engine comprising:
   an $SO_x$ trap catalyst for trapping $SO_x$ contained in exhaust gas arranged in an engine exhaust passage, wherein:
      said $SO_x$ trap catalyst contains $SO_2$ adsorption-use oxides which adsorb $SO_2$ contained in exhaust gas and an $SO_x$ storage material which stores $SO_x$ in the form of sulfates,
      said $SO_x$ trap catalyst has a property of being able to adsorb $SO_2$ contained in exhaust gas at the $SO_2$ adsorption-use oxides without oxidizing and has a property whereby $SO_2$ adsorbed at the $SO_2$ adsorption-use oxides is oxidized and is stored in the form of sulfates in the $SO_x$ storage material when a temperature of the $SO_x$ trap catalyst becomes higher than a start temperature of adsorbed $SO_2$ movement where the $SO_2$ adsorbed at the $SO_2$ adsorption-use oxides starts to move toward the $SO_x$ storage material, and, during engine operation, the temperature of the $SO_x$ trap catalyst is made to repeatedly change from less than said start temperature of adsorbed $SO_2$ movement to more than said start temperature of adsorbed $SO_2$ movement,
      said $SO_2$ adsorption-use oxides are comprised of metal oxides, and
      said metal oxides are comprised of an oxygen adsorbing and releasing material which changes in oxidation state in the exhaust gas.

2. An exhaust purification system of an internal combustion engine as claimed in claim 1, wherein the metal forming the oxygen adsorbing and releasing material is comprised of cerium Ce or iron Fe.

3. An exhaust purification system of an internal combustion engine as claimed in claim 1, wherein said $SO_x$ storage material is formed from at least one ingredient selected from the group consisting of alkali metals and alkali earth metals.

4. An exhaust purification system of an internal combustion engine as claimed in claim 1, wherein the $SO_x$ trap catalyst has a coat layer including said $SO_2$ adsorption-use oxide and $SO_x$ storage material and raises a basicity of deep parts of the coat layer compared with a surface side of the coat layer.

5. An exhaust purification system of an internal combustion engine as claimed in claim 1, wherein when the temperature of the $SO_x$ trap catalyst is less than the start temperature of adsorbed $SO_2$ movement, a concentration of oxygen in the exhaust gas which flows into the $SO_x$ trap catalyst is made to increase to promote an adsorption action of the $SO_2$.

6. An exhaust purification system of an internal combustion engine as claimed in claim 1, wherein said $SO_x$ storage material is formed from at least one member selected from the group consisting of potassium K, sodium Na, cesium Cs, barium Ba, and Calcium Ca.

7. An exhaust purification system of an internal combustion engine as claimed in claim 1, wherein a temperature elevation action of the $SO_x$ trap catalyst is performed so that the temperature of the $SO_x$ trap catalyst exceeds said start temperature of adsorbed $SO_2$ movement when the temperature of the $SO_x$ trap catalyst does not exceed the start temperature of adsorbed $SO_2$ movement for a predetermined time period.

8. An exhaust purification system of an internal combustion engine as claimed in claim 7, wherein an electronic control unit configured to calculate $SO_2$ adsorption amount adsorbed at the $SO_2$ adsorption-use oxides is provided, and the temperature elevation action of the $SO_x$ trap catalyst is performed when the calculated $SO_2$ adsorption amount exceeds a predetermined allowable limit value.

9. An exhaust purification system of an internal combustion engine as claimed in claim 1, wherein an alkali metal is used as the $SO_x$ storage material and a temperature of the $SO_x$ trap catalyst is maintained at less than a melting point of nitrates of said alkali metal.

10. An exhaust purification system of an internal combustion engine as claimed in claim 9, further provided with a bypass pipe configured to cool the exhaust gas which flows into the $SO_x$ trap catalyst when the temperature of the $SO_x$ trap catalyst exceeds or might exceed the melting point of nitrates of the alkali metal.

\* \* \* \* \*